United States Patent [19]

Häberle

[11] Patent Number: 5,707,941
[45] Date of Patent: Jan. 13, 1998

[54] POLYURETHANES SUITABLE AS COATING MATERIALS

[75] Inventor: Karl Häberle, Speyer, Germany

[73] Assignee: BASF Aktiengesellschaft, Ludwigshafen, Germany

[21] Appl. No.: 422,906

[22] Filed: Apr. 17, 1995

[30] Foreign Application Priority Data

Apr. 22, 1994 [DE] Germany ............... 44 14 032.0

[51] Int. Cl.⁶ .................................................. C08G 18/00
[52] U.S. Cl. .............................. 528/44; 528/49; 528/52; 528/65; 528/85; 524/589; 524/590; 428/423.1; 427/385.5
[58] Field of Search .................... 528/44, 49, 52, 528/65, 85; 524/589, 590; 408/423.1; 427/385.5

[56] References Cited

U.S. PATENT DOCUMENTS

| | | | |
|---|---|---|---|
| 3,153,088 | 10/1964 | Arthur | 260/563 |
| 3,361,844 | 1/1968 | Hoeschele et al. | 260/858 |

FOREIGN PATENT DOCUMENTS

| | | |
|---|---|---|
| 961049 | 7/1967 | Canada . |
| 507 173 | 10/1992 | European Pat. Off. . |
| 42 31 034 | 3/1994 | Germany . |
| 1220715 | 1/1971 | United Kingdom . |
| 1365854 | 9/1974 | United Kingdom . |

OTHER PUBLICATIONS

Polyurethane Elastomers Based on Aliphatic Diisocyanates, Seneker et al., 34th Annual Polyurethane Technical Marketing Conference Oct. 21–24. 1002, 588–597.

*Primary Examiner*—James J. Seidleck
*Assistant Examiner*—Duc Truont
*Attorney, Agent, or Firm*—Keil & Weinkauf

[57] ABSTRACT

Polyurethanes suitable as coating materials or components thereof are essentially composed of A)
  $a_1$) from 40 to 100 mol % of bis(4-isocyanatocyclohexyl) methane, the trans/trans content of ($a_1$) being up to 18 mol %, based on the amount of ($a_1$), and
  $a_2$) from 0 to 60 mol % of further polyfunctional aliphatic, cycloaliphatic, araliphatic or aromatic isocyanates of 4 to 30 carbon atoms and B)
  $b_1$) from 20 to 100 mol % of a nonaromatic diol and
  $b_2$) from 0 to 80 mol % of further polyfunctional compounds having reactive groups which can react with the isocyanate groups (A), the reactive groups being hydroxyl or primary or secondary amino groups.

11 Claims, No Drawings

POLYURETHANES SUITABLE AS COATING MATERIALS

The present invention relates to novel polyurethanes which are suitable as coating materials or components thereof and are composed essentially of A)
- $a_1$) from 40 to 100 mol % of bis(4-isocyanatocyclohexyl)methane, the trans/trans content of ($a_1$) being up to 18 mol %, based on the amount of ($a_1$), and
- $a_2$) from 0 to 60 mol % of further polyfunctional aliphatic, cycloaliphatic, araliphatic or aromatic isocyanates of 4 to 30 carbon atoms and
B)
- $b_1$) from 20 to 100 mol % of a nonaromatic diol and
- $b_2$) from 0 to 80 mol % of further polyfunctional compounds having reactive groups which can react with the isocyanate groups (A), the reactive groups being hydroxyl or primary or secondary amino groups.

The present invention furthermore relates to aqueous emulsions or nonaqueous solutions which contain the polyurethanes, the use of these emulsions or solutions as coating materials and articles which are provided with coatings and are obtainable using these emulsions or solutions.

Polyurethanes which are suitable for the preparation of coating materials, for example finishes, textile and leather coatings and glass fiber sizes, are generally known. Coating materials such as aqueous emulsions or nonaqueous solutions which contain polyurethanes which are based on nonaromatic isocyanates are particularly advantageously used for such applications, since such polyurethanes are particularly stable to light-induced degradation. Polyurethanes which are particularly suitable for these purposes are those based on commercial bis(4-isocyanatocyclohexyl)methane (Ullmanns Encyclopädie der technischen Chemie, 4th Edition, volume 19, pages 301 to 341). These are industrial mixtures which contain, as a rule, from 20 to 25% by weight of the trans,trans isomer

from 45 to 60% by weight of the cis,trans isomer

from 10 to 30% by weight of the cis,cis isomer

and from 5 to 10% by weight of various other isomers of bis(isocyanatocyclohexyl)methane.

Coating materials based on polyurethanes whose isocyanate component contains more than 40 mol % of bis(4-isocyanatocyclohexyl)methane have good performance characteristics. Coatings produced from them are, for example, very resistant to many chemicals and solvents and also have high mechanical strength, for example abrasion resistance.

Polyurethane Elastomers Based on Aliphatic Diisocyanates, S. D. Seneker, J. W. Rosthauser and P. H. Markusch, Conference Report on the 34th Annual Polyurethane Technical Marketing Conference, October 21–24, 1992, pages 588 to 597, discloses that the hardness, the modulus of elasticity, the extensibility and the notched impact strength of polyurethanes obtained from the isocyanate ($a_1$) and polytetrahydrofuran having a molecular weight of 2,000 increase with increasing trans/trans isomer contents of ($a_1$) in the range from 20 to 100 mol %, based on the amount of the isocyanate component.

EP-A 0 507 173 describes aqueous emulsions which contain polyurethanes which carry hydrophilic groups to improve the water dispersibility and contain from 20 to 100% of trans,trans-bis-(4-isocyanatocyclohexyl)methane, based on the amount of bis(4-isocyanatocyclohexyl)methane. Here too, the rigidity and hardness increase with increasing content of trans,trans-bis-(4-isocyanatocyclohexyl)methane.

Furthermore, DE-A 42 31 034 discloses that textiles and leather which are coated with polyurethanes which contain more than 30 mol % of the trans/trans isomer of ($a_1$) as the isocyanate component have good performance characteristics and, for example, do not stick during plating.

A disadvantage, however, is that films of these coating materials have insufficient transparency for some applications. In addition, highly concentrated solutions of these polyurethanes are highly viscous. In many cases, the high viscosity leads to technical difficulties during processing, so that relatively large amounts of solvents are required for dilution. This is frequently the case, for example, when solvent-based polyurethane finishes are applied or polyurethanes are dispersed in water. Moreover, the stability of the emulsions is unsatisfactory since they tend to form coagulants on prolonged storage.

It is an object of the present invention to provide polyurethanes which are suitable for the preparation of coating materials which do not have the stated deficiencies.

We have found that this object is achieved by the polyurethanes defined at the outset, processes for their preparation and the use thereof as coating materials or adhesives.

The novel polyurethanes contain isocyanates as monomers (A),
- the amount of bis(4-isocyanatocyclohexyl)methane ($a_1$) being at least 40, preferably at least 50, and particularly preferably at least 60, mol % and
- the bis(4-isocyanatocyclohexyl)methane ($a_1$) containing less than 18, preferably less than 15, particularly preferably less than 12, mol % of the trans,trans isomer.

Mixtures of stereoisomers in which the ratio of cis,cis isomers to cis,trans isomers is from 0.2:1 to 3:1 and particularly preferably from 0.3:1 to 1:1, are preferably used.

Methods for separating the isomers are known and have been used to date to isolate pure trans,trans-bis(4-isocyanatocyclohexyl)methane or mixtures of bis(4-isocyanatocyclohexyl)methane having a very high content of trans,trans-bis(4-isocyanatocyclohexyl)methane, in order to prepare the corresponding polyurethanes therefrom.

The desired mixtures of the isomer can be obtained in a simple manner starting from commercial bis(4-isocyanatocyclohexyl)methane which can be prepared industrially on a large scale. The relevant processes are described in U.S. Pat. Nos. 4,983,763, 1,127,338 and EP-A 0 453 941.

For example, the trans,trans isomer is crystallized from the isomer mixture having a content of more than 20% by weight at from −20° to 20° C. and is separated off. The liquid isomer mixture thus obtained contains only from about 15 to 18 mol % of the trans,trans isomer.

Processes such as fractional distillation are suitable for further separation of that fraction of the isomer mixture which is liquid at from −20° to 20° C. and give the particular isomers in substantially pure form.

It is also possible to carry out the separation into the corresponding isomers at the stage of the starting compounds for the bis(4-isocyanatocyclohexyl)methane, i.e. bis (4-aminocyclohexyl)methane, from which bis(4-isocyanatocyclohexyl)methane is prepared industrially by phosgenation. Here too, the method of fractional crystallization of the stereoisomers has proven particularly useful. Suitable processes are described, for example, in U.S. Pat. No. 2,494,563, 3,384,661, 3,153,088 and 3,393,236.

In addition to bis(4-isocyanatocyclohexyl)methane ($a_1$), the polyurethane may contain essentially up to 60, preferably up to 50, mol %, based on the total amount of the isocyanate component (A), of further polyfunctional aromatic, cycloaliphatic, araliphatic and/or aromatic isocyanates (a2) of 4 to 30 carbon atoms.

Diisocyanates $X(NCO)_2$, where X is an aliphatic hydrocarbon radical of 4 to 12 carbon atoms, a cycloaliphatic or aromatic hydrocarbon radical of 6 to 15 carbon atoms or an araliphatic hydrocarbon radical of 7 to 15 carbon atoms, are mentioned in particular. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4-diisocyanatodiphenylmethane, m-tetramethylxylylene diisocyanate, p-xylylene diisocyanate and mixtures consisting of these compounds.

Particularly important mixtures of these isocyanates are the mixtures of the particular structural isomers of diisocyanatotoluene and diisocyanatodiphenylmethane, in particular mixtures of about 20 mol % of 2,4-diisocyanatotoluene and 80 mol % of 2,6-diisocyanatotoluene. The mixtures of aromatic isocyanates, such as 2,4-diisocyanatotoluene and/or 2,6-diisocyanatotoluene, with aliphatic or cycloaliphatic isocyanates, such as hexamethylene diisocyanate or IPDI, are also particularly advantageous, the preferred mixing ratio of the aliphatic to the aromatic isocyanates being from 0.2:1 to 4:1.

Isocyanates which carry further blocked isocyanate groups, for example uretdione or urethane groups, in addition to the free isocyanate groups may also be used as compounds (A).

In order to prepare polyurethanes having a certain degree of branching or crosslinking, for example, trifunctional or tetra-functional isocyanates may be used. Such isocyanates are obtained, for example, by reacting difunctional isocyanates with one another by derivatizing some of their isocyanate groups to biuret, allophanate or isocyanurate groups.

Furthermore, monofunctional isocyanates may be used for chain termination. Their amount is preferably not more than 10 mol %, based on the total amount of the monomers (A). The monoisocyanates preferably carry further functional groups, such as hydrophilic groups, olefinic groups or carbonyl groups, and are used for introducing into the polyurethane functional groups which permit dispersing, crosslinking or polymer-analogous reactions of the polyurethane. Olefinically unsaturated monoisocyanates which are capable of free radical polymerization, such as the isomers of isopropenyl-α,α-dimethylbenzyl isocyanate, are suitable for this purpose.

In the case of the monomers (B), a distinction is made between $b_1$) nonaromatic diols, which are present in an amount of from 20 to 100, preferably from 30 to 100, particularly preferably from 40 to 100, mol %, based on the monomers (B), and $b_2$) further polyfunctional compounds having reactive groups which can react with the isocyanate groups of (A), the reactive groups being hydroxyl or primary or secondary amino groups. The amount of ($b_2$) is from 0 to 80, preferably from 0 to 70, particularly preferably from 0 to 60, mol %, based on the monomers (B).

Suitable monomers ($b_1$) with regard to film formation and flexibility are mainly relatively high molecular weight diols ($b_{1.1}$) which have a molecular weight of from about 500 to 5,000, preferably from about 1,000 to 3,000, g/mol.

The monomers ($b_{1.1}$) are in particular polyesterpolyols which are disclosed, for example, in Ullmanns Encyklopädie der technischen Chemie, 4th Edition, volume 19, pages 62 to 65. Polyesterpolyols which are obtained by reacting dihydric alcohols with dibasic carboxylic acids are preferably used. Instead of the free polycarboxylic acids, the corresponding polycarboxylic anhydrides or corresponding polycarboxylic esters of lower alcohols or mixtures thereof may be used for the preparation of the polyesterpolyols. The polycarboxylic acids may be aliphatic, cycloaliphatic, araliphatic, aromatic or heterocyclic and, if required, may be substituted, for example by halogen, and/or unsaturated. Examples of these are succinic acid, adipic acid, suberic acid, azelaic acid, sebacic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric fatty acids.

Examples of suitable polyhydric alcohols are ethylene glycol, propane-1,2-diol, propane-1,3-diol, butane-1,4-diol, butane-1,3-diol, butene-1,4-diol, butyne-1,4-diol, pentane-1,5-diol, hexane-1,6-diol, octane-1,8-diol, neopentylglycol, bis(hydroxymethyl)cyclohexanes, such as 1,4-bis (hydroxymethyl)cyclohexane, 2-methylpropane-1,3-diol and diethylene glycol, triethylene glycol, tetraethylene glycol, polyethylene glycol, dipropylene glycol, polypropylene glycol, dibutylene glycol and polybutylene glycols.

Polycarbonate diols, as can be obtained, for example, by reacting phosgene with an excess of the low molecular weight alcohols mentioned as components for the polyesterpolyols, are also suitable.

Lactone-based polyesterdiols are also suitable, these being homopolymers or copolymers of lactones, preferably adducts of lactones with suitable difunctional initiator moelcules, which adducts have terminal hydroxyl groups. Examples of suitable lactones are epsilon-caprolactone, β-propiolactone, gammabutyrolactone and/or methyl-epsilon-caprolactone and mixtures thereof. Examples of suitable initiator molecules are the low molecular weight dihydric alcohols mentioned above as components for the polyesterpolyols. The corresponding polymers of epsilon-caprolactone are particularly preferred. Lower polyesterdiols or polyetherdiols may also be used as initiators for the preparation of the lactone polymers. Instead of the polymers of lactones, the appropriate, chemically equivalent polycondensates of the hydroxycarboxylic acids corresponding to the lactones may also be used.

Other suitable monomers ($b_{1.1}$) are polyetherdiols. They are obtainable in particular by polymerization of ethylene oxide, propylene oxide, butylene oxide, tetrahydrofuran, styrene oxide or epichlorohydrin with themselves, for example in the presence of $BF_3$, or by an addition reaction of these compounds, as a mixture or in succession, with initiator components having reactive hydrogen atoms, such as alcohols or amines, e.g. water, ethylene glycol, propane-1,2-diol, propane-1,3-diol, 1,2-bis(4-hydroxydiphenyl) propane or aniline.

The polyesterdiols and polyetherediols may also be used as mixtures in the ratio of from 0.1 1 to 9:1.

The hardness and the modulus of elasticity of the polyurethanes can be increased if, in addition to the monomers ($b_{1.1}$), low molecular weight diols ($b_{1.2}$) having a molecular weight of from about 50 to 500, preferably from 60 to 200, g/mol are also used as monomers ($b_1$).

The components of the short-chain diols mentioned for the preparation of polyesterpolyols are used in particular as monomers ($b_{1.2}$), the straight-chain diols having 2 to 12 carbon atoms and an even number of carbon atoms being preferred.

Preferably, only monomers ($b_{1.1}$) and ($b_{1.2}$) are used as monomers ($b_1$) for synthesizing the polyurethanes, the amount of the monomers ($b_{1.1}$) being from 15 to 100, preferably from 50 to 65, mol %, based on the total amount of the monomers ($b_{1.1}$) and ($b_{1.2}$).

The monomers ($b_2$) include for example, alcohols having a functionality of more than 2, which may be used for establishing a certain degree of branching or crosslinking, for example trimethylolpropane, glycerol or sugar.

Furthermore, minor amounts, i.e. preferably less than 10 mol %, based on the monomers ($b_1$) and ($b_2$), of monoalcohols may be used for chain termination. Their function is in general similar to that of the monoisocyanates. Examples are esters of acrylic or methacrylic acid, such as hydroxyethyl acrylate or hydroxyethyl methacrylate. Other suitable monoalcohols are those which, in addition to the hydroxyl group, carry a further group reactive toward isocyanates, such as monoalcohols having one or more primary and/or secondary amino groups, e.g. monoethanolamine.

The monomers ($b_2$) also include compounds having one or more amino groups reactive towards isocyanates. Since amines generally react more rapidly than alcohols or water with isocyanates, the amines are used especially when the chain extension or crosslinking is to take place in the presence of water. This is frequently necessary when aqueous dispersions of crosslinked polyurethanes or polyurethanes having a high molecular weight are desired. In such cases, prepolymers having isocyanate groups are prepared, rapidly dispersed in water and then subjected to chain extension or crosslinking by adding compounds having a plurality of amino groups reactive towards isocyanates.

Amines suitable for this purpose are in general polyfunctional amines having a molecular weight of from 32 to 500, preferably from 60 to 300, g/mol, which contain at least two primary or two secondary amino groups or one primary and one secondary amino group. Examples of these are diamines, such as diaminoethane, diaminopropanes, diaminobutanes, diaminohexanes, piperazine, 2,5-dimethylpiperazine, amino-3-aminomethyl-3,5,5-trimethylcyclohexane (isophorondiamine, IPDA), 4,4'-diaminodicyclohexylmethane, 1,4-diaminocyclohexane, aminoethylethanolamine, hydrazine or hydrazine hydrate or triamines, such as diethylenetriamine or 1,8-diamino-4-aminomethyloctane.

The amines may also be used in blocked form, for example in the form of the corresponding ketimines (cf. for example CA-1 129 128), ketazines (cf. for example U.S. Pat. No. 4,269,748) or amine salts (cf. U.S. Pat. No. 4,292,226). Oxazolidines, as used, for example, in U.S. Pat. No. 4,192,937, are also blocked polyamines which may be used for the preparation of the novel polyurethanes for chain extension of the prepolymers. When such blocked polyamines are used, they are generally mixed with the prepolymers in the absence of water and this mixture is then mixed with the dispersing water or a part of the dispersing water so that the corresponding polyamines are liberated hydrolytically.

Mixtures of di- and triamines are preferably used, mixtures of isophoronediamine and diethylenetriamine being particularly preferred.

If it is intended to prepare aqueous dispersions of the novel polyurethanes, in accordance with the generally known principle the polyurethanes carry hydrophilic groups in amounts which cause them to be self-emulsifiable. Self-emulsifiable polyurethanes are understood as meaning those which can be dispersed in water without the action of strong shear forces and without the use of additional surfactants, such as protective colloids or emulsifiers.

For the preparation of such self-emulsifying polyurethanes, some of the monomers (a2), ($b_1$) and/or ($b_2$) contain hydrophilic groups or groups which can be converted into hydrophilic groups (abbreviated below to potentially hydrophilic groups) and which react with isocyanates substantially more slowly than the functional groups of the monomers which are used for synthesizing the polymer main chain. Alcoholic hydroxyl groups and primary and secondary amino groups are therefore not among the (potentially) hydrophilic groups. The amount of the monomers having (potentially) hydrophilic groups as a proportion of the total amount of the monomers (A) and (B) is generally such that the molar amount of the (potentially) hydrophilic groups is from 30 to 1,000, preferably from 50 to 500, particularly preferably from 80 to 300, mmol/kg, based on the total amount of all monomers (A) and (B).

The (potentially) hydrophilic groups may be nonionic or, preferably, (potentially) ionic hydrophilic groups.

Particularly suitable nonionic hydrophilic groups are polyethylene glycol ethers comprising preferably from 5 to 100, particularly preferably from 10 to 80, ethylene oxide repeat units. The content of polyethylene oxide units is in general from 0 to 10, preferably from 0 to 6, % by weight, based on the weight of all monomers (A) and (B).

Preferred monomers having nonionic hydrophilic groups are polyethylene glycol and diisocyanates which carry a polyethylene glycol radical etherified in the terminal position. Such diisocyanates and processes for their preparation are described in U.S. Pat. No. 3,905,929 and 3,920,598.

Ionic hydrophilic groups are in particular anionic groups, such as sulfonate, carboxylate and phosphate in the form of their alkali metal or ammonium salts and cationic groups, such as ammonium, in particular protonated tertiary amino or quaternary ammonium.

Potentially ionic hydrophilic groups are in particular those which can be converted by simple neutralization, hydrolysis or quaternization reactions into the abovementioned ionic hydrophilic groups, for example carboxyl, anhydride or tertiary amino groups.

(Potentially) ionic monomers ($a_2$), ($b_1$) and ($b_2$) are described in detail, for example, in Ullmanns Encyklop ädie der technischen Chemie, 4th Edition, volume 19, pages 311–313, and, for example, in DE-A 1 495 745.

These include, for example, the following (potentially) cationic monomers:

Monomers ($a_2$) having halogen atoms capable of undergoing quaternization reactions are, for example, chlorohexyl isocyanate and bis(chloromethyl)diphenylmethane diisocyanate.

Examples of corresponding monomers (B) are in particular the chlorine or bromine derivatives of aliphatic $C_2$–$C_6$-mono- or diols. The stated halogen-containing compounds may be quaternized or ternized with tertiary amines, sulfides or phosphines. Quaternary ammonium and phosphonium salts or ternary sulfonium salts result. Such quaternizing agents are, for example, trialkylamines, dialkyl sulfides and trialkylphosphines, the alkyl radicals independently of one another being of 2 to 6 carbon atoms.

Monomers having tertiary amino groups are of particular pratical importance, for example tris(hydroxyalkyl)amines, N,N'-bis-(hydroxyalkyl)alkylamines, N-hydroxyalkyldialkylamines, tris(aminoalkyl)amines, N,N'-bis(aminoalkyl)alkylamines and N-aminoalkyldialkylamines, the alkyl radicals and alkanediyl units of these tertiary amines independently of one another being of 2 to 6 carbon atoms. Tertiary nitrogen-containing polyethers having preferably two terminal hydroxyl groups, as obtainable in a conventional manner, for example by alkoxylation of amines having two hydrogen atoms bonded to amine nitrogen, for example methylamine, aniline, or N,N'-dimethylhydrazine, are also suitable. Such polyethers generally have a molecular weight of from 500 to 6,000 g/mol.

These tertiary amines are converted into the ammonium salts either by means of acids, preferably strong mineral acids, such as phosphoric acid, sulfuric acid or hydrohalic acids, or by reaction with suitable quaternizing agents, such as $C_1$–$C_6$-alkyl halides, for example bromides or chlorides.

The following compounds are usually used as monomers having (potentially) anionic groups:

Monomers ($b_1$) and ($b_2$) having carboxylate groups are particularly important. For example, aliphatic, cycloaliphatic, araliphatic or aromatic mono- and dihydroxycarboxylic acids are suitable. Dihydroxyalkyanecarboxylic acids, especially of 3 to 10 carbon atoms, as also described in U.S. Pat. No. 3,412,054, are preferred. Compounds of the general formula

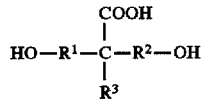

where $R^1$ and $R^2$ are each a $C_1$–$C_4$-alkanediyl unit and $R^3$ is a $C_1$–$C_4$-alkyl unit, especially dimethylolpropionic acid (DMPA), are particularly preferred.

Corresponding dihydroxysulfonic acids and dihydroxyphosphonic acids, such as 2,3-dihydroxypropanephosphonic acid, are also suitable.

In particular, dihydroxy compounds having a molecular weight of from more than 500 to 10,000 g/mol and at least 2 carboxyl or carboxylate groups are disclosed in DE-A 3 911 827. They are obtainable by subjecting dihydroxy compounds to a polyaddition reaction with tetracarboxylic dianhydrides, such as pyromellitic dianhydride or cyclopentanetetracarboxylic dianhydride in a molar ratio of from 2:1 to 1.05:1. Particularly suitable dihydroxy compounds are the monomers ($b_1$) mentioned.

Suitable monomers ($b_2$) having amino groups reactive toward isocyanates are aminocarboxylic acids, such as lysine, β-alanine, the adducts, stated in DE-A 2 034 479, of aliphatic diprimary diamines with α,β-unsaturated carboxylic acids, such as N-(2-aminoethyl)-2-aminoethanecarboxylic acid and the corresponding N-aminoalkylaminoalkanecarboxylic acids, the alkanediyl units being of 2 to 6 carbon atoms.

If monomers having potentially ionic groups are used, they may be converted into the ionic form before, during or, preferably, after the isocyanate polyaddition, since the ionic monomers are frequently only poorly soluble in the reaction mixture.

The manner in which the molecular weight of the polyurethanes can be established by the choice of the amounts of the monomers (A) and (B) which are reactive with one another and the arithmetic mean of the number of reactive functional groups per molecule is generally known from polyurethane chemistry.

Usually, the monomers (A) and (B) and their particular molar amounts are chosen so that the ratio C:D where C) is the molar amount of isocyanate groups and
D) is the sum of the molar amount of hydroxyl groups and the molar amount of functional groups which can undergo an addition reaction with isocyanates is from 0.5:1 to 2:1, preferably from 0.8:1 to 1.5:1, particularly preferably from 0.9:1 to 1.2:1. Very particularly preferably, the ratio C:D is as close as possible to 1:1.

Monomers (A) and (B) having only one reactive group or having more than 2 reactive groups are in general used in amounts of up to 15, preferably up to 8, mol %, based on the total number of monomers (A) and (B).

The polyurethanes are preferably composed of from 0 to 50, particularly preferably from 10 to 40, mol % of a polyamine having at least 2 amino groups of monomer (B) which are reactive toward isocyanates.

Various processes for the preparation of the polyurethanes are known (cf. Ullmanns Encyclopädie der technischen Chemie, 4th Edition, volume 19, pages 310 to 340).

The polyurethanes can be obtained by mass polymerization of the monomers (A) and (B), but solution polymerization is frequently preferred owing to the lower viscosity of the resulting reaction mixtures.

Suitable solvents are all liquids which are inert toward the reactants, for example ethers, such as diethyl ether and tetrahydrofuran, esters, such as butyl acetate and ethyl acetate, ketones, such as acetone, butanone and methyl amyl ketone, alkylaromatics, e.g. toluene and xylenes, and amides, such as dimethylformamide, dimethylacetamide and N-methylpyrrolidone.

The concentration of the monomers in the reaction mixture is usually from 30 to 100, preferably from 50 to 100, % by weight. The monomers (A) and (B) are generally reacted at from 20° to 180° C., preferably from 50° to 150° C., under atmospheric pressure.

The required reaction time may range from a few minutes to a few hours. The manner in which the reaction time is influenced by a large number of parameters, such as temperature, concentration of the monomers and reactivity of the monomers, is known from polyurethane chemistry.

The usual catalysts, such as dibutyltin dilaurate, tin(II) octoate or diazabicyclo[2.2.2]octane, may be used for accelerating the reaction of the diisocyanates.

Suitable polymerization apparatuses are stirred kettles, in particular when a low viscosity and good removal of heat are ensured by the presence of solvents. If the reaction is carried out by mass polymerization, extruders, in particular self-purging multi-screw extruders, are particularly suitable owing to the generally high viscosities and the generally short reaction times.

Suitable multiscrew extruders here are the multiscrew, in particular twin-screw, extruders known per se in plastics processing, preferably double-thread or triple-thread, twin-screw, self-purging continuous kneaders and compounders. The extruders have at least one devolatilization orifice and are generally thermostatable zone by zone to ensure an optimum procedure. The screws are preferably self-purging and rotate in the same direction and are adapted in their design to the particular working conditions in the usual sections of the extruder. The choice of the suitable screws or screw elements for an optimum procedure is familiar to a person skilled in the art (cf. Schneckenmaschinen in der Verfahrenstechnik, H. Hermann, Springer Verlag, Berlin, Heidelberg, New York 1972).

The polyurethanes are marketable in the form of their solutions and in granulated form.

With the aid of emulsifiers, polyurethanes can be converted into an aqueous dispersion using strong shear forces. In practice, however, aqueous dispersions of self-emulsifiable polyurethane which are composed of monomers which carry (potentially) hydrophilic groups are preferred.

In general, the dispersions are prepared by one of the following methods:

In the acetone method, an ionic polyurethane is prepared, in a water-miscible solvent which boils below 100° C. at atmospheric pressure, from the monomers (A) and (B), using monomers which carry hydrophilic groups. Water is added to form a dispersion in which water represents the coherent phase. The solvent is then distilled off.

The prepolymer mixing method differs from the acetone method in that, instead of a completely reacted hydrophilic polyurethane, a prepolymer which carries isocyanate groups is first prepared. Here, the monomers (A) and (B) are chosen so that the ratio C:D conforming to the definition is greater than from 1.0 to 3, preferably from 1.05 to 1.5. The prepolymer is first dispersed in water and then crosslinked by reacting the isocyanate groups with amines which carry more than 2 amino groups reactive toward isocyanates, or subjected to chain extension with amines which carry 2 amino groups reactive toward isocyanates. Chain extension also takes place when no amine is added. In this case, isocyanate groups are hydrolyzed to amino groups, which react with remaining isocyanate groups of the prepolymers with chain extension.

Hydrophobic assistants which may be difficult to disperse homogeneously in the prepared dispersion may also be added to the polyurethane or to the prepolymer before dispersing, by the method described in U.S. Pat. No. 4,306,998.

The polyurethane content of the dispersions may be in particular from 5 to 70, preferably from 20 to 50, % by weight, based on the dispersions.

The polyurethane dispersions or solutions to be used according to the invention may be used as such or as a mixture with other dispersions or solutions of homo- or copolymers of, for example, acrylates or methacrylates, styrene or butadiene, said homo- or copolymers having a charge of the same sign. They can be applied by spraying, pouring or knife-coating.

Powder coating binders which contain high-melting polyurethanes and blocked isocyanates which react with the polyurethanes during baking and cure them are also attracting increasing interest.

The powders having a mean particle diameter of from 10 to 100 μm can be prepared, for example, by milling the polyurethane granules at from −50° to −100° C. or by spray-drying solutions.

Assistants, for example thickeners, thixotropic agents, antioxidants, UV stabilizers, mold release agents, fillers or pigments, may be added to the dispersions, powders or solutions. In practice, film formation is effected by conventional methods known to a person skilled in the art, such as those known, for example, from coating and adhesive processing, depending on the applica- tion. In most cases, the solutions and dispersions are converted into a film at from 20° to 110° C. and the powders at from 90° to 130° C. The dispersions, solutions or powders are used as coating materials for any desired substrates, such as textiles, leather, metal, wood, woodworking materials or plastics, for the adhesive bonding of the stated materials or for the production of films.

The coating materials and films which can be prepared from the novel polyurethanes have, for most applications, a completely satisfactory level with regard to the mechanical properties and in particular high transparency. The novel polyurethanes have a comparatively low viscosity in solution, which permits a saving of solvents, for example in the preparation of polyurethane dispersions or in the processing of solvent-based coating materials.

There are additional advantages in the case of aqueous dispersions of the polyurethanes which carry hydrophilic groups. In general, it is desirable to minimize the amount of hydrophilic groups so that the water resistance of the coatings is very high. On the other hand, sufficient amounts of hydrophilic groups must be incorporated in the polyurethane to ensure that the polyurethanes are readily dispersible and have a sufficiently long shelf life. It has been found that this conflict of aims in the case of the novel polyurethanes can more readily be resolved than in the case of comparable polyurethanes because the novel polyurethanes can be prepared using a smaller amount of hydrophilic groups than the previously known polyurethanes, without their dispersibility being adversely affected.

EXAMPLE

A commercial bis(4-isocyanatocyclohexyl)methane having a chromatographically determined content of 26.0% by weight of cis,cis isomer 44.6% by weight of cis,trans isomer and 21.1% by weight of trans,trans isomer was stored for 24 hours at 0° C., a crystalline sediment forming. The supernatant liquid was decanted and was used for the preparation of the polyurethane. Its isomer content was as follows 28.1% by weight of cis,cis isomer 47.1% by weight of cis,trans isomer and 16.1% by weight of trans,trans isomer.

A mixture of 400 g (0.2 mol) of a polyesterdiol having an OH number of 56 (synthesized from adipic acid, neopentylglycol and hexane-1,6-diol), 27 g (0.3 mol) of butane-1, 4-diol, 0.2 g of dibutyltin dilaurate and 100 g of acetone was initially taken in a cylindrical reactor which had a diameter of 25 cm and was equipped with an anchor stirrer to which an apparatus for measuring the torque was connected. 161.2 g (0.61 mol) of the bis(4-isocyanatocyclohexyl)methane having a reduced trans,trans isomer content were added to the mixture and stirring was carried out for 360 minutes at 70° C. The resulting prepolymer solution was diluted with 600 g of acetone and brought to 50° C. It had an NCO content of 0.69% by weight. Thereafter, 46.2 g (0.11 mol) of a 40% strength by weight aqueous solution of an adduct of ethylenediamine with sodium acrylate were first added, followed after a further 10 minutes by 1,200 g of water in the course of 60 minutes while stirring. The acetone was distilled off from the resulting dispersion under reduced pressure.

Comparative Example

The example was repeated with commercial bis(4-isocyanatocyclohexyl)methane.

The results of the test are listed in the table.

The viscosity of the prepolymer solution was determined indirectly by measuring the torque required to operate the stirrer at 100 revolutions per minute. The stated torque is based on a prepolymer solution which, prior to dilution with acetone, had a temperature of 70° C. and an NCO content of 1.34% by weight.

The size of the latex particles was determined indirectly by turbidity measurements. For this purpose, the turbidity of a dispersion having a solids content of 0.01% by weight was determined relative to distilled water with a path length of 2.5 cm at room temperature.

$LT = \text{intensity}_{disp} \times 100/\text{intensity}_{water}$.

The transparency of the film was determined visually. For the production of the film the dispersion was applied in a layer thickness of 1 mm to a glass sheet and was dried.

The tensile strength and the elongation at break were determined in tensile tests in the usual manner using dried films and are stated in $N/mm^2$ and in percent, respectively. The standard deviation of the measurement is shown in each case in parentheses after the respective value.

To test the shelf life, the dispersions were stored for three weeks at room temperature and then examined to determine whether a sediment had formed.

|  | Example | Comparative Example |
|---|---|---|
| Torque [Ncm] | 41 | 47 |
| LT value | 72 | 49 |
| Transparency of the film | transparent | opaque |
| Tensile strength [N/mm²] | 27.2 (1.4) | 27.8 (1.1) |
| Elongation at break [%] | 595 (16) | 582 (20) |
| Shelf life | no sedimentation | sedimentation |

We claim:

1. A polyurethane consisting essentially of
A)
   $a_1$) from 40 to 100 mol % of bis(4-isocyanatocyclohexyl)methane, the trans/trans content of ($a_1$) being up to 18 wt, based on the amount of ($a_1$), and $a_2$) from 0 to 60 mol % of further polyfunctional aliphatic, cycloaliphatic, araliphatic or aromatic isocyanates of 4 to 30 carbon atoms and B)
   $b_1$) from 20 to 100 mol % of a nonaromatic diol and
   $b_2$) from 0 to 80 mol % of further polyfunctional compounds having reactive groups which can react with the isocyanate groups (A), the reactive groups being hydroxyl or primary or secondary amino groups.

2. A polyurethane as defined in claim 1, which is partly composed of monomers ($a_2$), ($b_1$) or ($b_2$) which, in order to improve the water dispersibility of the polyurethane, carry hydrophilic groups which have little or no reactivity with isocyanates.

3. A polyurethane as defined in claim 1, wherein the ratio of the cis/cis isomer to the cis/trans isomer of bis(4-isocyanatocyclohexyl)methane is from 0.2:1 to 3:1.

4. A polyurethane as defined in claim 1 wherein component $b_1$ is composed of
   $b_{1.1}$) from 15 to 85 mol %, based on the total amount of the monomers ($b_1$), which have a molecular weight of from 500 to 5,000 g/mol, and
   $b_{1.2}$) from 15 to 85 mol %, based on the total amount of the monomers ($b_1$), which have a molecular weight of from 60 to 500 g/mol.

5. A polyurethane as defined in claim 1, composed of from 0 to 50 mol % of a polyamine having at least 2 amino groups reactive toward isocyanates, as monomer (B).

6. A polyurethane as defined in claim 1, in which the ratio of all isocyanate groups of the monomers (A) to all those functional groups of the monomers (B) which are reactive with isocyanate groups is from 0.5:1 to 2:1.

7. An aqueous dispersion or nonaqueous solution containing a polyurethane as defined in claim 1.

8. A method for adhesive bonding or coating of articles, wherein the dispersion or nonaqueous solution as defined in claim 7 is applied to the articles.

9. A coated or adhesively bonded article, obtained using an aqueous dispersion or nonaqueous solution as claimed in claim 8 as the coating material or adhesive.

10. A polyurethane as defined in claim 1, wherein component $a_1$ has a trans/trans content of up to 15 wt %.

11. A polyurethane as defined in claim 1, wherein component $a_1$ a trans/trans content of up to 12 wt %.

* * * * *